(12) United States Patent
Yu et al.

(10) Patent No.: US 7,651,378 B2
(45) Date of Patent: Jan. 26, 2010

(54) ELECTRICAL CARD CONNECTOR WITH GUIDE MEMBER

(75) Inventors: Hung-Chi Yu, Tu-cheng (TW);
Yung-Chang Cheng, Tu-cheng (TW);
Cai-Fu Li, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/217,212

(22) Filed: Jul. 1, 2008

(65) Prior Publication Data
US 2009/0017689 A1    Jan. 15, 2009

(51) Int. Cl.
*H01R 24/00*    (2006.01)
(52) U.S. Cl. ........................ 439/630; 439/607
(58) Field of Classification Search ........... 439/630, 439/607, 159, 157
See application file for complete search history.

(56) References Cited

U.S. PATENT DOCUMENTS

| 7,090,513 | B2 | 8/2006 | Kuo | |
|---|---|---|---|---|
| 7,247,054 | B2 | 7/2007 | Kuo et al. | |
| 2005/0277333 | A1 * | 12/2005 | Kuo | 439/607 |

* cited by examiner

*Primary Examiner*—Javaid Nasri
(74) *Attorney, Agent, or Firm*—Andrew C. Cheng; Wei Te Chung; Ming Chieh Chang

(57) ABSTRACT

An electrical card connector for receiving at least two different cards, comprises: an insulative housing; a plurality of contacts received in the housing; an L-shaped shell assembled on the housing defining a receiving space for receiving the card; and a guide member assembled on the shell with a spring plate extending into the receiving space. When an L-shaped electrical card inserts into the connector, it could be keep in the connector steadily because of the friction between the card and the spring plate.

15 Claims, 5 Drawing Sheets

US 7,651,378 B2

ELECTRICAL CARD CONNECTOR WITH GUIDE MEMBER

BACKGROUND OF THE INVENTION

1. Field of the Invention

The present invention generally relates to an electrical card connector, and more particularly to an electrical card connector having a high transmission speed.

2. Description of Prior Art

With the development of portable computer, the dimension gets more and more smaller so that it need more memory cards to meet the requirement. Accordingly, more and more electrical card connectors are widely used in the portable computer. Nowadays, the portable computer always is used in a jolty environment, so it is important to provide a stable signal transmission between the electrical card and the connector in the portable computer.

A prior art discloses such an electrical card connector comprising a housing, a shell covering the housing and a plurality of contacts received in the housing. Said shell is configured of an L-shape with a notch besides said housing, a guide member is attached to the shell near the notch for guiding the electrical card inserting. When the electrical card is inserted into the connector, a retaining force is formed between the contacts and the card to hold the card in the connector in a steady environment. But the retaining force is so limited that the electrical card may escape from the connector in a jolty environment to affect the normal using of the computer.

Hence, it is desirable to have an improved card connector to overcome the above-mentioned disadvantages of the prior art.

BRIEF SUMMARY OF THE INVENTION

Accordingly, the object of the present invention is to provide an electrical card connector for an L-shaped electrical card retaining in the connector reliability.

In order to achieve the above-mentioned object, an electrical card connector comprises: an insulative housing, a plurality of contacts received in the insulative housing, an L-shaped shell assembled on the housing defining a receiving space for receiving the card and a guide member assembled on the shell with a spring plate extending into the receiving space, when an L-shaped card mates with the electrical card connector, the spring plate is opposed on the surface of the card elastically.

Other objects, advantages and novel features of the invention will become more apparent from the following detailed description of the present embodiment when taken in conjunction with the accompanying drawings.

DETAILED DESCRIPTION OF THE INVENTION

Figure 1:
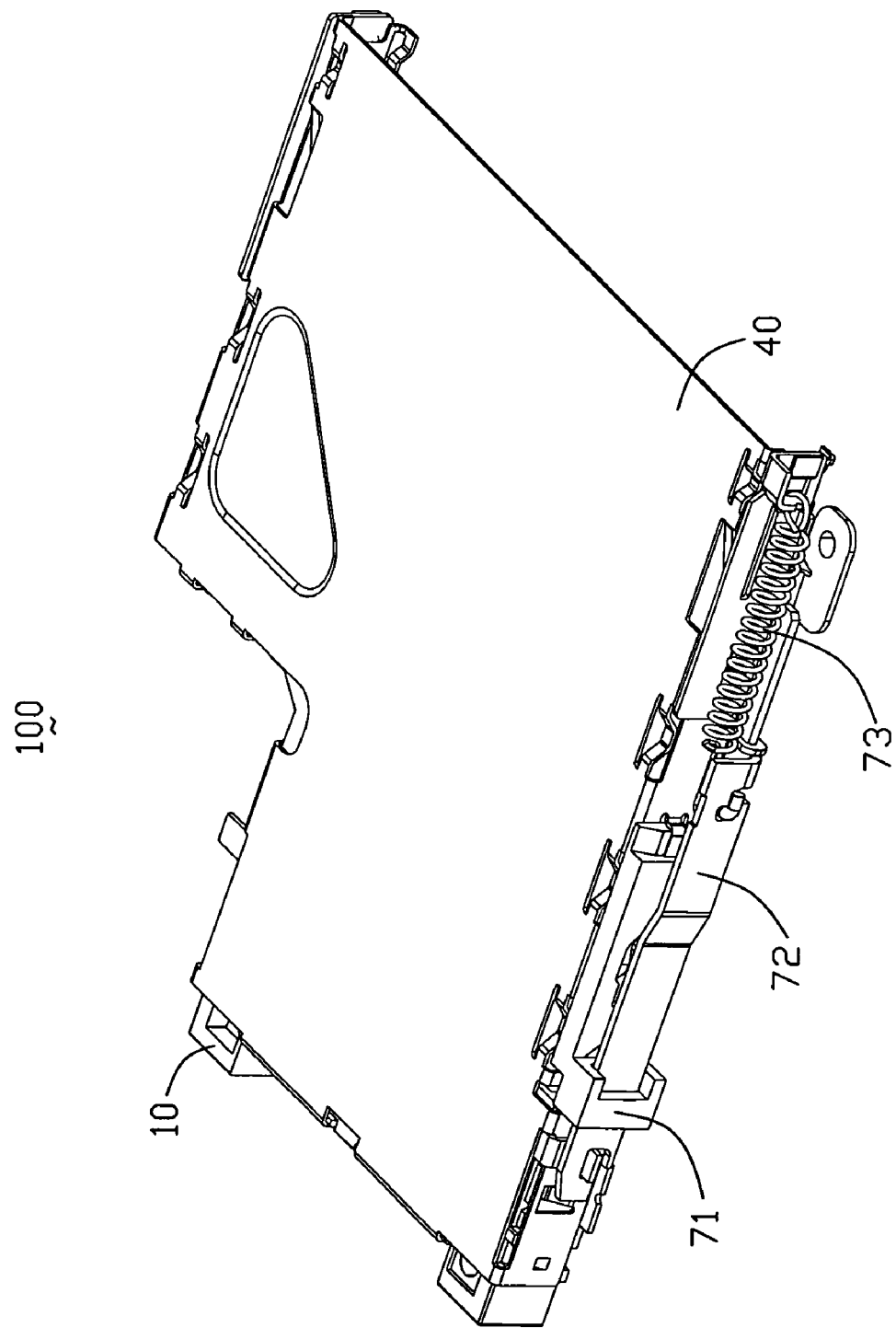
FIG. 1 is a perspective view of an electrical card connector in accordance with the present invention.

Reference will now be made to the drawing figures to describe the present invention in detail.

Referring to FIGS. 1-5, an electrical card connector 100 in accordance with the present invention comprises an insulative housing 10, a plurality of contacts 20, a pair of grounding pieces 30 received in the housing 10, a shell 40 covering the housing 10, a guide member 50 retained by the shell 40, a pair of stand offs 60 assembled on the lateral side of the shell 40 and an ejecting mechanism 70.

Figure 2:
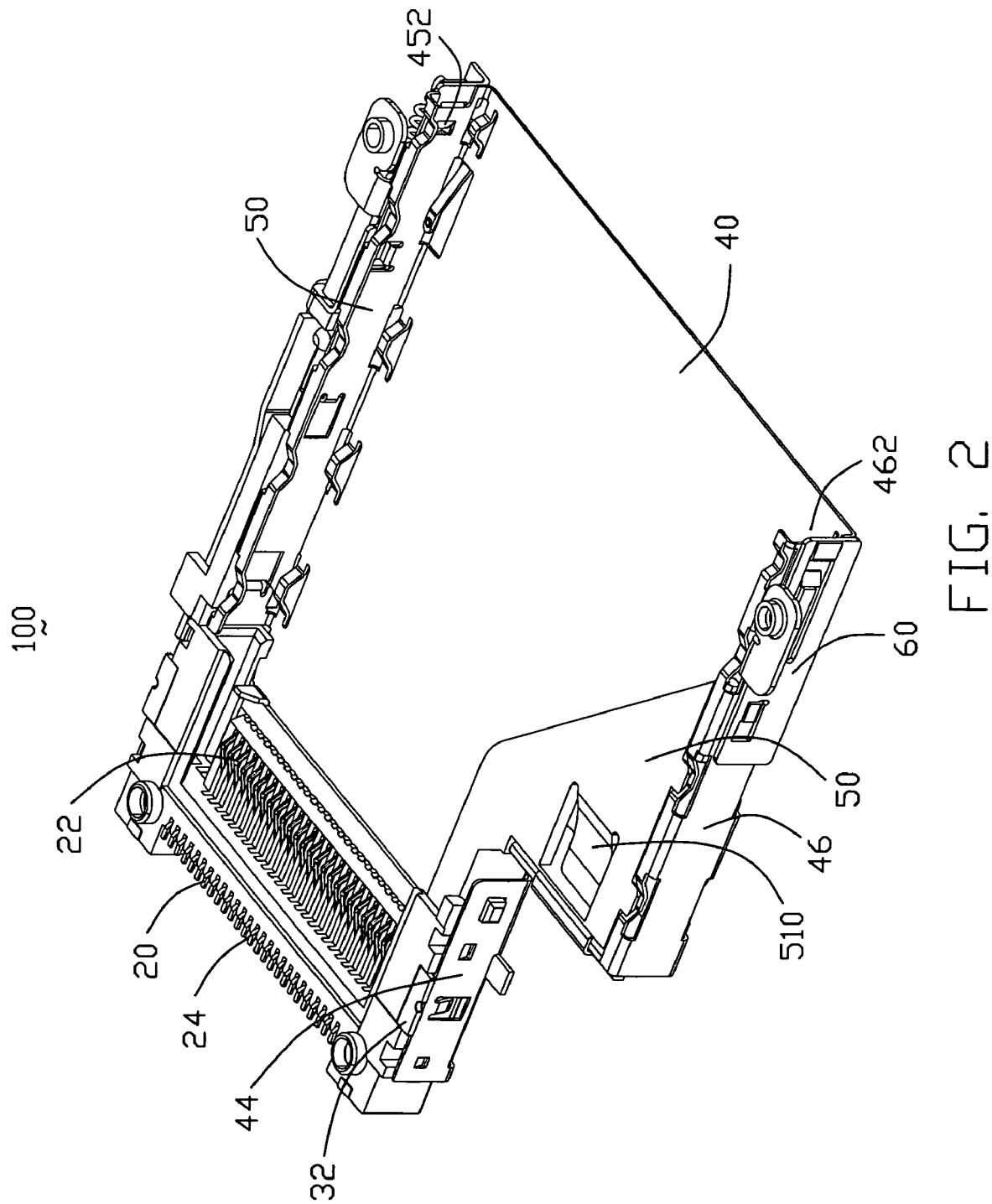
FIG. 2 is another perspective view of the electrical card connector shown in FIG. 1.
Figure 3:
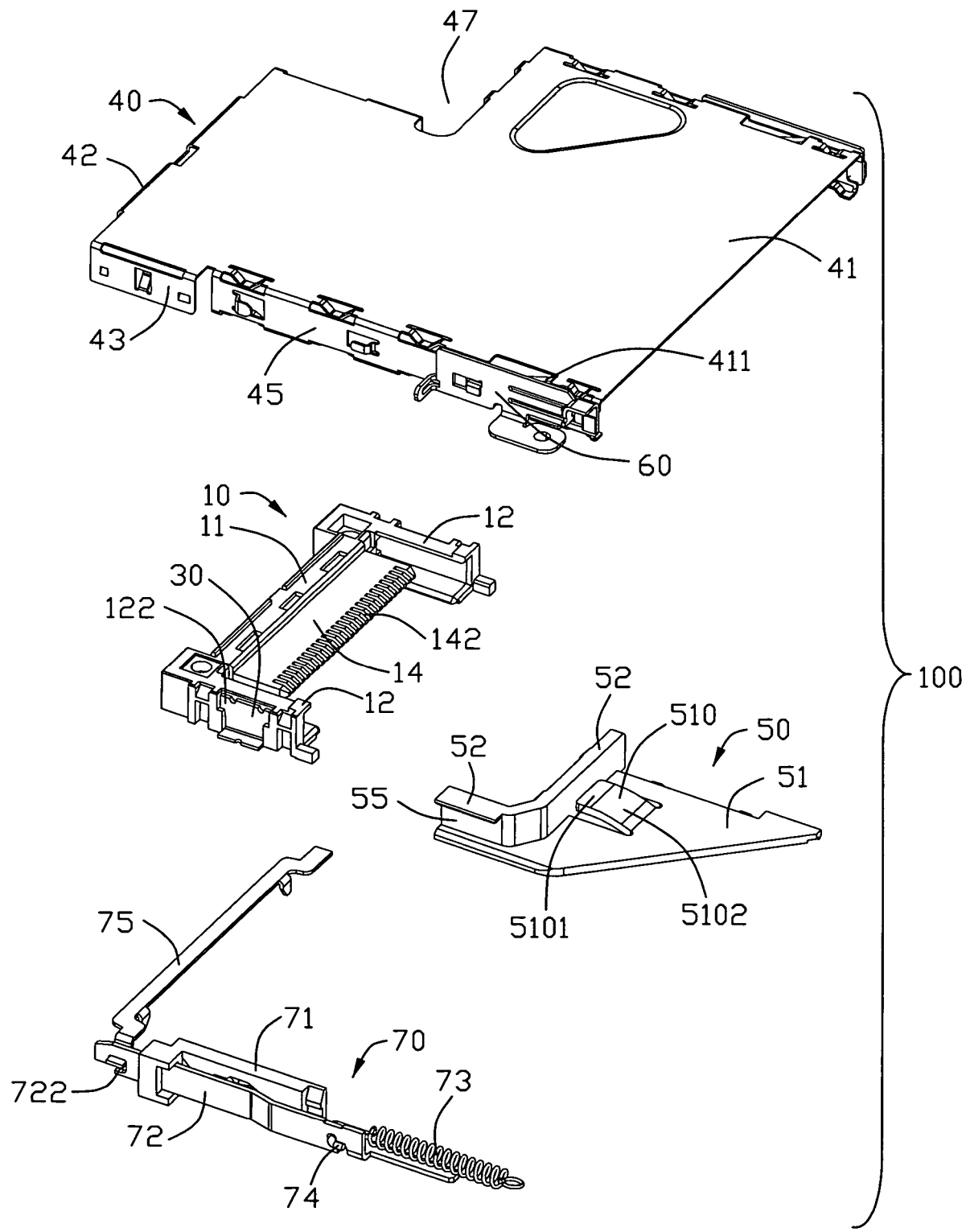
FIG. 3 is an exploded, perspective view of the electrical card connector shown in FIG. 1.
Figure 4:
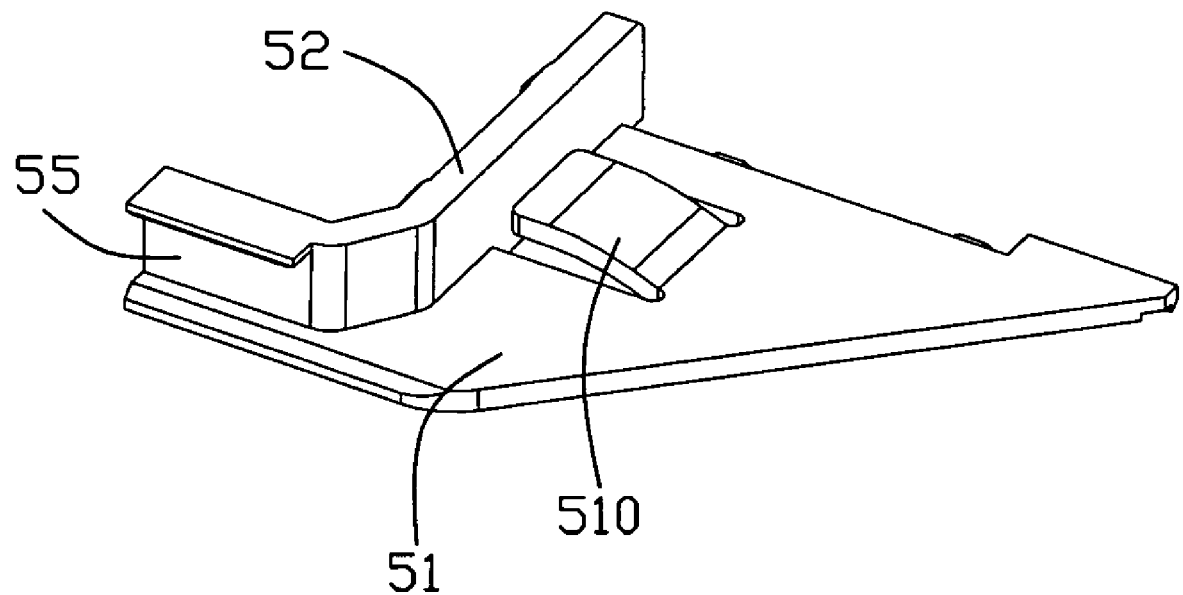
FIG. 4 is a perspective view of a guide member of the electrical card connector.
Figure 5:
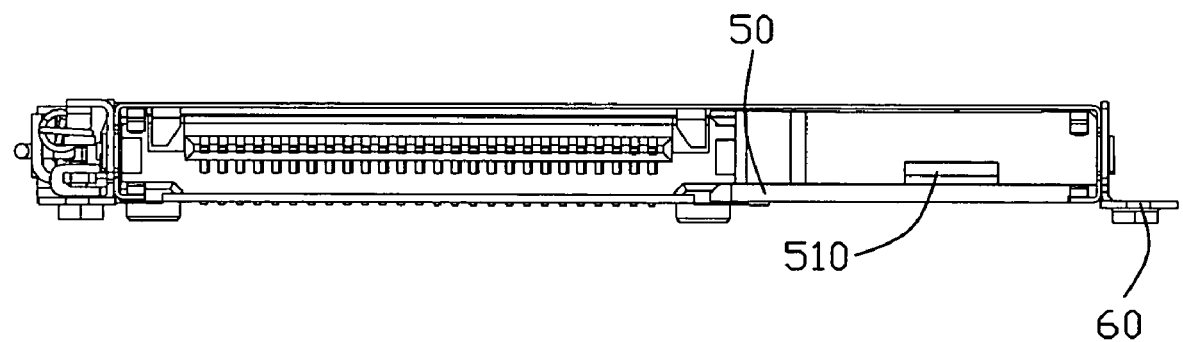
FIG. 5 is rear elevational view of the card connector in accordance with the present invention.

Referring to FIG. 2 and FIG. 3, the insulative housing 10 is elongate and comprises a base portion 11, a pair of side arms 12 extending from lateral side of the base portion 11 and a mating portion 14 for engaging with an electrical card. There is a gap (not labeled) between the mating portion 14 and each side arm 12 for guiding the electrical card insertion. The mating portion 14 forms a plurality of passageway 142 for receiving the contacts 20. Each side arm 12 forms a receiving slit 122 at the lateral side thereof for holding the grounding piece 30. Each grounding pieces 30 connects the shell 40 to a Print Circuit Board (PCB) (not shown) electrically to make the electrical card connector 100 get a good anti-EMI effect.

Referring to FIG. 2, a plurality of contacts 20 are received in the insulative housing 10 along a front-to-rear direction. Each contact 20 comprises a contact portion 22 for electrically connecting with the electrical card, a retention portion (not labeled) extending forwardly from the contact portion 22 and a solder portion 24 extending out of the front wall of the housing 10.

Referring to FIGS. 1-3, the shell 40, formed by a metallic sheet, comprises a main body 41 in an L-shaped, a plurality of sidewalls extending downwardly from edges of the main body 41 forming a receiving space for accommodating the electrical card and a notch 47 in the front thereof beside the insulative housing 10. These sidewalls comprise a front wall 42 extending from the front edge of the main body 41, a first and a second sidewalls 43, 44 at opposite sides of the front wall 42, a third sidewall 45 disposed in the same side with the first sidewall 43, a fourth sidewall 46 disposed in the same side with the second sidewall 44 and a longitudinal sidewall (not labeled) disposed between the second sidewalls 44 and the fourth sidewall 46. Said insulative housing 10 is disposed in the front end of the shell 40 and engages with the front wall 42, the first and second sidewall 43, 44, respectively. The third and fourth sidewall 45, 46 extend inwardly defining two guiding grooves 452, 462 to guide the electrical card inserting into the connector. The pair of stand offs 60 are assembled on the third and fourth sidewall 45, 46 at the rear end thereof for holding the electrical card connector 100 on the PCB.

Referring to FIGS. 2-5, the guide member 50, engaging with the shell 40, assumes a triangular shape and comprises a board portion 51 and an L-shaped perpendicular wall 52 extending forwards and upwardly from the front edge of the board portion 51. The board portion 51 abuts against the fourth sidewall 46 and the longitudinal sidewall (not labeled), the perpendicular wall 52 abuts against the second sidewall 44 of the shell 40 and the longitudinal sidewall (not labeled). The perpendicular wall 52 forms a guide channel 55 extending in a front-to-rear direction for guiding the electrical card inserting into or ejecting out of the electrical card connector 100. The board plate 51 forms a spring plate 510 extending into the receiving space. Said spring plate 510 has certain elasticity and comprises an engagement portion 5101 extending horizontally and a connecting portion 5102 extending forwardly to connect the engagement portion 5101 to the board plate 51. When the L-shaped electrical card inserts into the connector 100, the spring plate 510 will press on the bottom surface of the electrical card to retain the electrical card in the connector 100 reliability even if in a jolty environment. In addition, the force between the electrical card and the spring plate 510 can be changed via adjusting the dimension of the spring plate 510.

Referring to FIG. 1 and FIG. 3, the ejecting mechanism 70 is attached to the third sidewall 45 of the shell 40 and comprises a slider 71 having a heart groove (not shown), a push rod 72, a spring 73, a link pin 74 and an ejecting rod 75. The push rod 72 is slidely assembled on the slider 71 with a limit hole 722 at an end thereof. The spring 73 has two ends, one end is fasten to the stand off 60 assembled on the shell 40, and the other end to the push rod 72 to drive the push rod 72. The link pin 74 connects with the push rod 72 and may slider in the heart groove of the slider 71. The ejecting rod 75 is sandwiched in between the dielectric housing 10 and the shell 40 by passing through the shell 40 and rotatablely connecting with the push rod 72 via the limit hole 722. The ejecting mechanism 70 is a push-push type, detailed description on work process and assembly of the ejecting mechanism 70 omits thereafter, for it is obvious to an ordinary skilled person in this art.

When the L-shaped electrical card accommodates with the connector 100, the spring plate 510 of the guiding member 50 withstands on bottom surface of the electrical card providing a retaining force, and the electrical card could be received in the connector 100 reliability even in a jolty environment. The dimension of the spring plate 510 can be adjusted to change the retaining force between the electrical card and the spring plate 510.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical card connector comprising:
   an insulative housing;
   a plurality of contacts received in the insulative housing;
   an L-shaped shell assembled on the housing and defining a receiving space for receiving a card; and
   a guide member assembled on the shell and having a spring plate extending into the receiving space, the spring plate being adapted to elastically abut against a surface of an inserted L-shaped card, and said spring plate extending towards a card insertion direction.

2. The electrical card connector as claimed in claim 1, wherein the guide member is disposed in the receiving space and comprises a board portion, the board portion extending horizontally and containing the spring plate, said board portion assuming a triangular shape.

3. The electrical card connector as claimed in claim 2, wherein the spring plate comprises an engagement portion and a connecting portion for connecting the engagement portion to the board portion.

4. The electrical card connector as claimed in claim 3, wherein the spring plate is integral with the board portion.

5. The electrical card connector as claimed in claim 1, wherein the spring plate is dimensioned to accommodate the force applied on the card.

6. The electrical card connector as claimed in claim 1, wherein the insulative housing comprises a base portion and a mating portion extending from the base portion.

7. The electrical card connector as claimed in claim 1, wherein the shell comprises a main body, a plurality of sidewalls extending downwardly from edges of the main body and a notch beside the insulative housing.

8. The electrical card connector as claimed in claim 7, wherein the guide member is assembled to the sidewall of the shell near the notch.

9. A card connector comprising:
   an insulative housing equipped with a plurality of contacts therein;
   a metallic shell assembled with the housing and cooperating with the housing to commonly define a card receiving space into which the contacts extend;
   an insulative guide member located around the card receiving space and in front of while laterally offset from the housing, and including a guide channel in alignment with a side guide arm of the housing in a front-to-back direction, and a triangular board portion with a deflectable spring arm unitarily extending upward into the card receiving space for resiliently deflectably forcibly abutting in a vertical direction against a card inserted into the card receiving space.

10. The card connector as claimed in claim 9, wherein said spring arm is located around a rear edge of a horizontal bar of said guide member under a condition that the horizontal bar cooperates with the guide channel to form an L-shaped configuration.

11. The card connector as claimed in claim 9, wherein said housing and said guide member are discrete from each other while both assembled to the shell, respectively.

12. The card connector as claimed in claim 9, wherein both said shell and said triangular board are located on different sides of the card receiving space in said vertical direction.

13. The card connector as claimed in claim 9, wherein said spring arm extends along said front-to-back direction.

14. The card connector as claimed in claim 9, wherein said spring arm urges the inserted card toward the shell in said vertical direction.

15. A card connector assembly comprising:
   an insulative housing equipped with a plurality of contacts therein;
   a metallic shell assembled with the housing and cooperating with the housing to commonly define a card receiving space into which the contacts extend;
   an insulative guide member located around the card receiving space and in front of while laterally offset from the housing, and including a guide channel in alignment with a side guide arm of the housing in a front-to-back direction, and a triangular board portion with a deflectable spring arm unitarily extending into the card receiving space; wherein
   said spring arm is configured to cooperate with the shell to resiliently sandwich therebetween an electronic card inserted into the card receiving space in a vertical direction perpendicular to said front-to-back direction.

* * * * *